(12) United States Patent
Terazawa

(10) Patent No.: US 6,397,339 B1
(45) Date of Patent: May 28, 2002

(54) METHOD AND APPARATUS FOR CONTROLLING CONSUMPTION CURRENT IN COMPUTER SYSTEM

(75) Inventor: Noboru Terazawa, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/239,958

(22) Filed: Jan. 29, 1999

(30) Foreign Application Priority Data

Jan. 30, 1998 (JP) .......................................... 10-018828

(51) Int. Cl.[7] .............................................. G06F 1/26
(52) U.S. Cl. ...................... 713/300; 713/310; 713/323
(58) Field of Search ................................ 713/300, 310, 713/320, 321, 324, 323; 710/62, 63, 129, 305; 709/253; 340/825.06; 370/912; 375/377; 455/127; 363/178

(56) References Cited

U.S. PATENT DOCUMENTS

| | | | | |
|---|---|---|---|---|
| 5,113,410 A | * | 5/1992 | Hamano et al. | |
| 5,412,809 A | * | 5/1995 | Tam et al. | |
| 5,603,106 A | * | 2/1997 | Toda | |
| 5,657,257 A | | 8/1997 | Lee | ............................ 364/707 |
| 5,659,763 A | * | 8/1997 | Ohashi | |
| 5,687,079 A | | 11/1997 | Bauer et al. | ................. 364/175 |
| 5,808,881 A | | 9/1998 | Lee | .............................. 363/37 |
| 5,838,579 A | * | 11/1998 | Olson et al. | |
| 5,991,285 A | * | 11/1999 | Ghosh | |
| 6,032,052 A | * | 2/2000 | Richardson | |

FOREIGN PATENT DOCUMENTS

| | | |
|---|---|---|
| JP | 5-11898 | 1/1993 |
| JP | 05-088798 | 4/1993 |
| JP | 8-63265 | 3/1996 |
| JP | 8-194564 | 7/1996 |
| JP | 9-282057 | 10/1997 |

OTHER PUBLICATIONS

Naoki Asami, Katsumi Yamashita, "Denryokukanri ga Pasokon wo Kaden ni Suru," Nikkei Electronics, Oct. 7, 1996, Nikkei Business Publications, Inc. No. 672, Oct. 7, 1996, pp. 75 to 93.

Kenji Oguma, "Chapter 3 Kitaisareru Pcyou Hanyou Basu USB no Gaiyou," Interface, Jan. 1997 issue, CG Publications, vol. 24, No. 1 (Total of 235), Jan. 1, 1997, pp. 117 to 126.

* cited by examiner

Primary Examiner—Gopal C. Ray
(74) Attorney, Agent, or Firm—Foley & Lardner

(57) ABSTRACT

To suppress the current consumed by peripherals which consumes during holding an application as much current as consumed during activating the application, host computer controls the consumption current of the peripherals by adding current control data for controlling the current, when the peripherals which are energized by a host computer communicate with the host computer by using packet transmission. Each peripheral further comprises data detection means for detecting current control data among the data received, and variable supply control unit which switches on/off the current supplied for the peripheral.

5 Claims, 4 Drawing Sheets

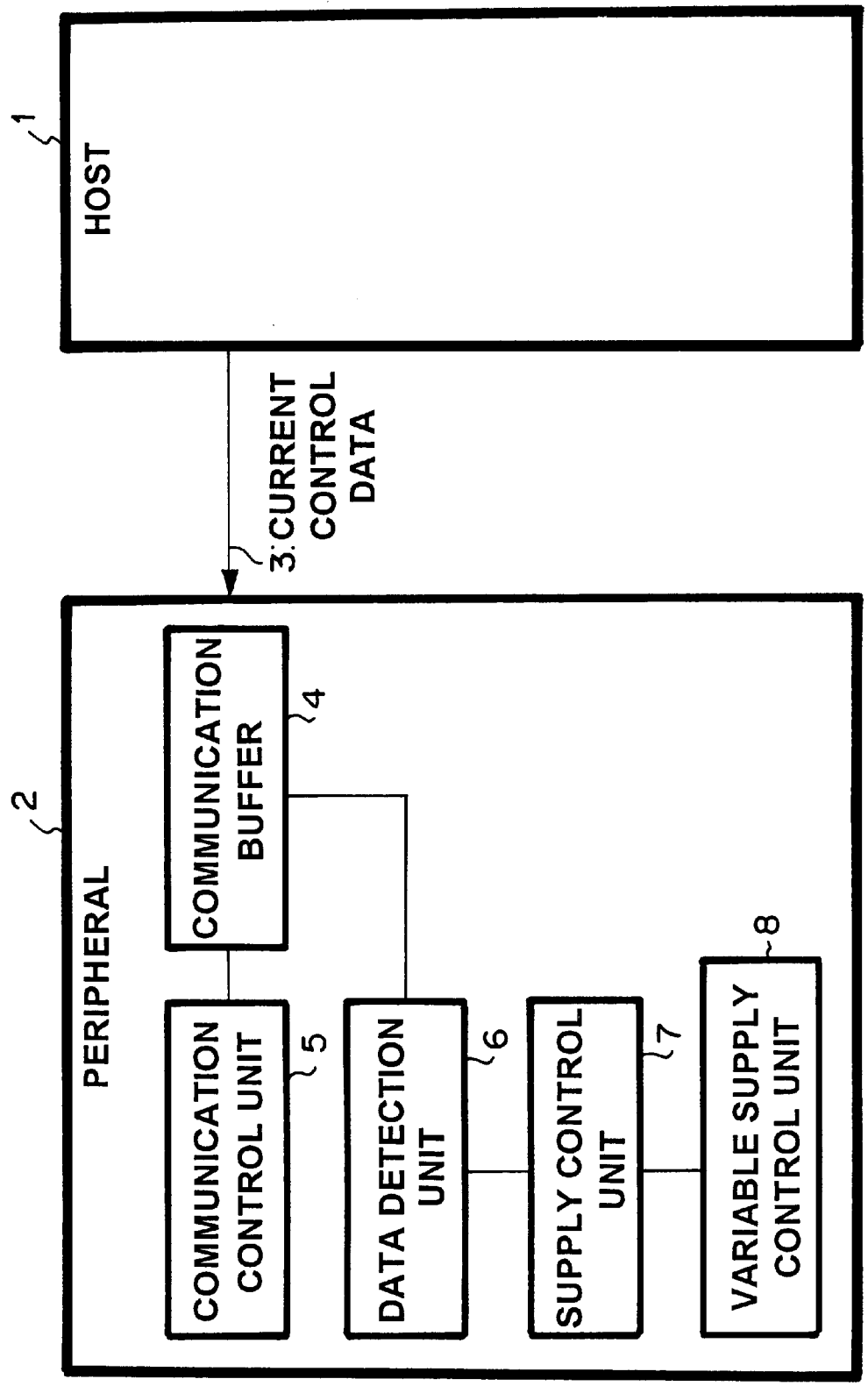

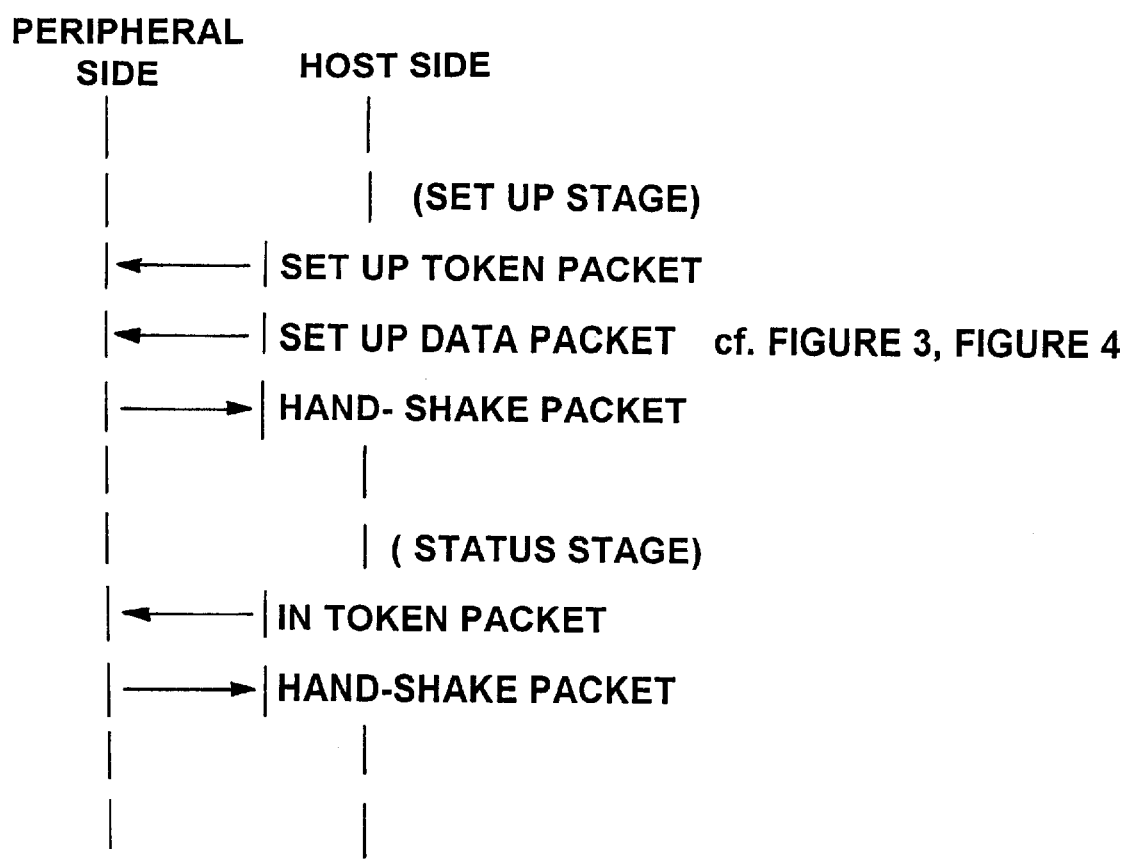

FIG.3

| OFFSET | FIELD(BYTES) | <VALUE> |
|---|---|---|
| OFFSET 0 | BM-REQUESTTYPE(1BYTE) | 0X41 |
| OFFSET 1 | B-REQUEST(1BYTE) | 0X10 |
| OFFSET 2 | W-VALUE(2BYTE) | LSB 0X**(NOTE 1) |
|  |  | MSB 0X00 |
| OFFSET 4 | W-INDEX(2BYTE) | LSB 0X00 |
|  |  | MSB 0X00 |
| OFFSET 6 | W-LENGTH(2BYTE) | LSB 0X00 |
|  |  | MSB 0X00 |

(NOTE 1) 「0X00」 MEANS SUPPLY ON.
「0X01」 MEANS SUPPLY OFF.

FIG.4

| OFFSET | FIELD(BYTES) | <VALUE> |
|---|---|---|
| OFFSET 0 | BM-REQUESTTYPE(1BYTE) | 0X41 |
| OFFSET 1 | B-REQUEST(1BYTE) | 0X**(NOTE 2) |
| OFFSET 2 | W-VALUE(2BYTE) | LSB 0X00 |
|  |  | MSB 0X00 |
| OFFSET 4 | W-INDEX(2BYTE) | LSB 0X00 |
|  |  | MSB 0X00 |
| OFFSET 6 | W-LENGTH(2BYTE) | LSB 0X00 |
|  |  | MSB 0X00 |

(NOTE 2) 「0X11」 MEANS SUPPLY ON.
「0X12」 MEANS SUPPLY OFF.

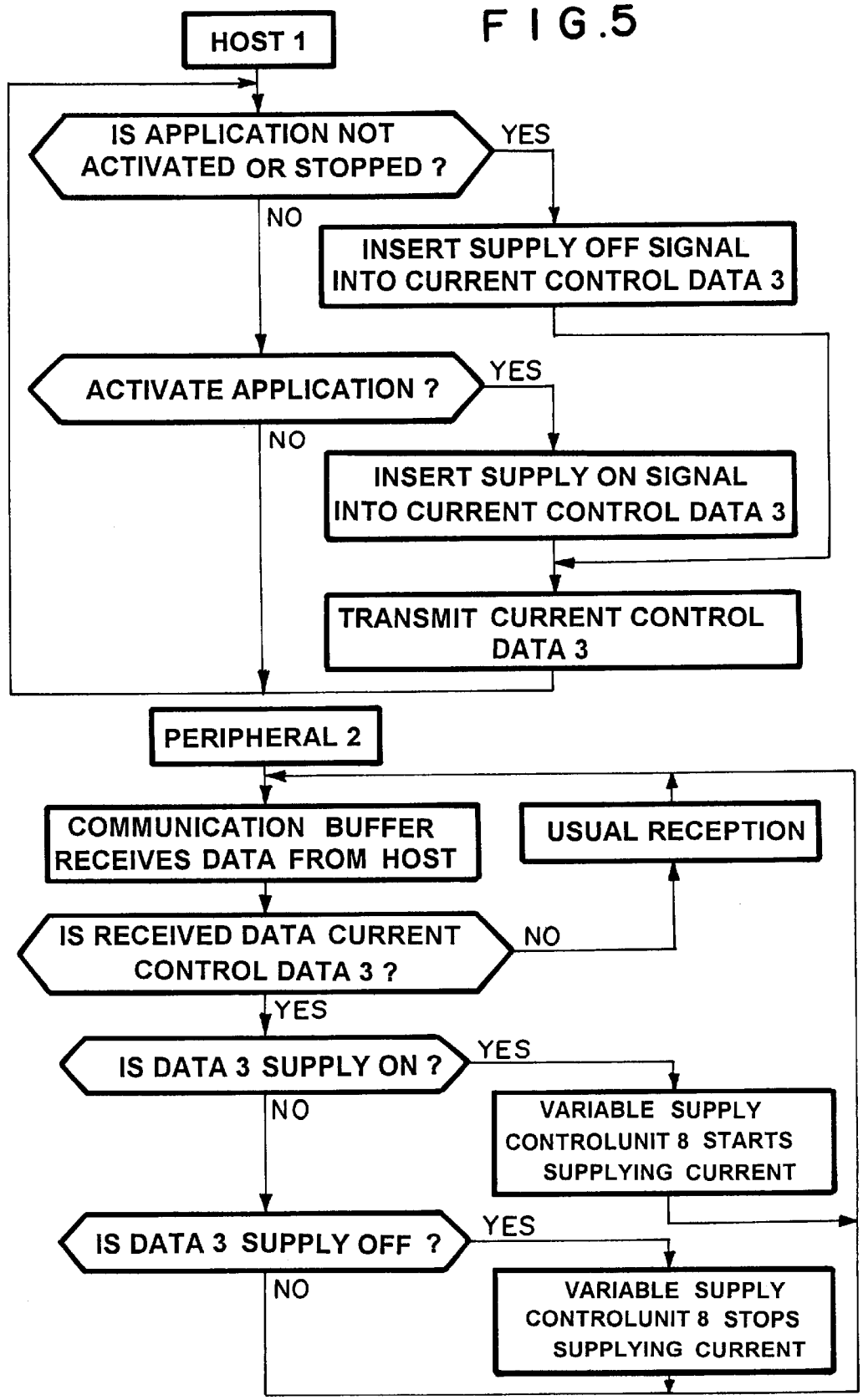

METHOD AND APPARATUS FOR CONTROLLING CONSUMPTION CURRENT IN COMPUTER SYSTEM

BACKGROUND OF THE INVENTION

1. Technical Field of the Invention

The present invention relates to a method and apparatus for controlling consumption current in a computer network, and particularly, to a method and apparatus for controlling consumption current in peripherals connected with a host computer.

2. Description of the Prior Art

Recently, there have been provided new interfaces compatible with plug and play, whereby a personal computer recognizes connections of peripherals to accomplish automatically the system configuration. Thus, circumstances for personal computers have become more and more user-friendly.

In one of these types of new interfaces, for example, such as the universal serial bus (USB), data communication is carried out between a personal computer and peripherals, by using several kinds of data transfer methods including packet communication.

The USB transports various types of packets such as token packet, data packet, and hand-shake packet for carrying out configuration control, guarantee/non-guarantee of data transmission band, guarantee/non-guarantee of real time transfer in isochronous transfer, bulk transfer, or interrupt transfer.

According to the protocol of the USB, the consumption current must not exceed 100 mA under the configuration state, while it must not exceed 100 mA–500 mA under the non-configuration state, depending upon supply capability of the USB. Here, the non-configuration state is defined as the state after finishing the configuration wherein the connected peripherals are ready to work.

For example, a peripheral which requires 50 mA under the configuration state and 300 mA under the non-configuration state had better to control the consumption current, depending upon the states.

Further, there is a peripheral which can detect the accomplishment of the configuration setup in order to control the consumption current.

According to the protocol of the USB, the consumption current must not exceed 100 mA under the configuration state, while it must not exceed 100 mA or 500 mA under the non-configuration state, depending upon supply capability of the USB.

However, the conventional technology has a disadvantage that unnecessary current is consumed by peripherals which consume as much current as consumed during activating an application, after completing the configuration.

Accordingly, batteries are soon exhausted in hand-held computers such as a note personal computer.

SUMMARY OF THE INVENTION

Therefore, an object of the present invention is to suppress unnecessary current which is consumed by peripherals which consume as much current as consumed during activating an application.

To solve the above-mentioned problems, the present invention provides a method of controlling the consumption current of the peripherals by adding data for controlling the current, when the peripherals are energized by a host computer. Here, the host computer communicates with the peripherals by using packet transfer.

The present invention also provides a method of controlling the consumption current of the peripherals by adding data for controlling the current, when the peripherals are energized by a host computer, wherein the consumption current is increased during activating an application, while it is decreased during pausing an application The present invention also provides a method of controlling the consumption current of the peripherals by adding data for controlling the current, when the peripherals which are energized by a host computer communicate with the host computer, through the universal serial bus (USB) interface.

Further, the current consumption is controlled by the transfer of the current control data through the USB.

Further, the current control data may be included in a data packet for SET UP transaction in a communication packet of the USB.

Furthermore, the present invention provides an apparatus for controlling the consumption current of the peripherals, which comprises host computer 1, and peripheral 2 which is energized by the host computer. Here, peripheral 2 exchanges communication data with host computer 1. Further, peripheral 2 farther comprises data detection means for detecting current control data 3 among the data received, and supply control unit 7 for generating supply control signal for variable supply control unit 8 which switches on/off the current supplied for peripheral 2.

Furthermore, the present invention provides an apparatus for controlling the consumption current of the peripherals, which comprises host computer 1, and peripheral 2 which is energized by the host computer. Here, peripheral 2 further comprises communication buffer 4 for communicating with the host computer 1, communication control unit 5 for controlling buffer 4, data detection means for detecting current control data 3 among the data received, supply control unit 7 for generating supply control signal for switching on/off the current on the basis of the output from data detection unit 6, and variable supply control unit 8 for switching on/off the current supplied for peripheral 2 on the basis of the supply control signal.

Further, host computer 1 may be connected with peripheral 2 by USB interface.

According to the method for controlling consumption current of the present invention, the consumption current of the peripherals is controlled by transmitting communication data which is implemented as control data, when the peripherals are energized by a host computer. Here, the host computer is connected with the peripherals through an interface, wherein the implementation of transferred data is freely assigned. The above-mentioned interface treats packets for carrying out configuration process, guarantee/non-guarantee of data transmission band, guarantee/non-guarantee of real time transfer.

Concretely, the present invention relates to a method for controlling the consumption current of the peripherals by using control transfer under the USB interface.

More concretely, host computer 1, and peripheral 2 which is energized by the host computer which exchanges communication data, as shown in FIG. 1, Further, peripheral 2 detects current control data 3 among the data received, and hand over supply control signal for variable supply control unit 8 which switches on/off the current supplied for peripheral 2. Thus, the current consumed by the peripherals becomes completely zero, or minimum.

An effect of the present invention lies in that the consumption current is suppressed in the peripherals which consumes during holding an application as much current as consumed during activating the application. This is because a host computer transmits current control data to its peripherals. Further, the current supply ON/OFF for apart of the circuits which are not required for activating applications is decided by the data communication.

Another effect of the present invention lies in that batteries are not exhausted soon in hand-held computers such as a note personal computer. This is because the supply ON/OFF data is transmitted at the timing synchronized with the star or hold of applications.

BRIEF EXPLANATION OF THE DRAWINGS

FIG. 1 is a block diagram of whole system of the present invention.

FIG. 2 is a sequence diagram of transmission and reception of a transfer data packet implemented which implements current control data 3 under the USB protocol.

FIG. 3 is an exemplary table of the contents of a transfer data packet implemented which implements current control data 3 under the USB protocol.

FIG. 4 is another exemplary table of the contents of a transfer data packet implemented which implements current control data 8 under the USB protocol.

FIG. 5 is a flow chart for explaining the action of the working example of the present invention.

PREFERRED EMBODIMENT OF THE INVENTION

In the following the preferred embodiment of the present invention is explained, referring to the drawings.

As shown in FIG. 1, peripheral 2 which is energized by the host computer comprises communication buffer 4 for communicating with the host computer 1, communication control unit 5 for controlling buffer 4, data detection means for detecting current control data 3 among the data received, supply control unit 7 for generating supply control signal for switching on/off the current on the basis of the output from data detection unit 6, and variable supply control unit 8 for switching on/off the current supplied for peripheral 2 on the basis of the supply control signal.

Further, host computer 1 and peripheral 2 may be connected by USB interface, although other interfaces are applicable.

The above-mentioned structure further requires CPU, subscribed control programs, recording media such as ROM, or floppy disks which store the control programs, supply control unit 7 and variable supply control unit 8 which employ conventional circuits, Referring to FIGS. 1 to 5, the action of the preferred embodiment is explained, First, host computer 1 transmits current control data 3 toward peripheral 2, at the time when peripheral 2 can diminish the consumption current due to the end of application programs, or when it requires more current consumption due to the start of application programs.

Peripheral 2 receives communication data at communication buffer 4 which is controlled by communication control unit 5 which hands over the communication data to data detection unit 6 to determine whether or not the communication data received by communication buffer 4 is current control data 3.

Data detection unit 6 interprets the implementation of the received data. When the received data is current control data 3 for switching on/off the supply of current, data detection unit 6 generates determination signal and hands it over to supply control unit 7.

When the determination signal is current control data 3 instructing switching on the supply of current, supply control unit 7 generates a supply on signal and hands it over to variable supply control unit 8 to start supplying current for peripheral 2.

On the other hand, when the determination signal is current control data 3 instructing switching off the supply of current, supply control unit 7 generates a supply off signal and hands it over to variable supply control unit 8 to end supplying current for peripheral 2.

In FIG. 1, illustrations are omitted about a supply unit for communication control unit 5, communication buffer 4, data detection unit 6, and supply control unit 7, all of which are required for current control by using data communication between host computer 1 and peripheral 2.

The data communication between host computer 1 and peripheral 2 is explained hereinafter more concretely, in case of using USB interface.

FIG. 2 is a sequence diagram of an example of data transfer on the USB protocol. Current control data 3 in the present invention is implemented in data packet for the SET UP transaction by using control transfer.

In FIG. 2, hand-shake packets such as ACK and NACK are packets for acknowledging or rejecting the states of transmission and reception of prescribed packets.

Token (transmission right) packet identifies the type of transaction executed on the communication bus. Here, the above-mentioned transaction means transportation of a service to an end point. A transaction comprises token packet, optional data packet, and optional hand-shake packet depending upon the type of transaction.

FIGS. 3 and 4 are exemplary tables of data packets. On the basis of the contents of the data packets, data detection unit 6 determines whether or not the received data is control data 3.

Further, the structure of current control data 3 in the USB interface is explained concretely.

FIG. 3 is an exemplary table of a packet data format for data phase in SET UP transaction which is necessary for control transfer under the USB protocol.

Current control data 3 is implemented by a <value>, for example [0x10] in FIG. 3, of bRequest of offset 1. Here, [0x] stands for the hexadecimal expression. Accordingly, current control data 3 is detected merely by confirming its value to be [0x10]. Various ways to carry out the above-mentioned confirmation can be cited. For example, the <value> decoded by hardware may be compared directly with [0x10]. It may be compared by using software. Further, bit-by-bit comparison is also possible by calculating AND of the <value> and [0x10].

Next, the <value> of offset 2 implements current control data 3 for supply ON/OFF. In FIG. 3, the <value> of supply ON is [0x00], while the <value> of supply OFF is [0x01]. Other <value>s are defined according to the USB protocol.

FIG. 4 is an exemplary table of a packet data format for data phase in SET UP transaction which is necessary for the control transfer under the USB protocol, wherein SET UP transactions are two-fold depending upon the <value> of brequest of offset 1 to implement supply ON/OFF.

In FIG. 4, the <value> of offset 1 implements current control data 3 for supply ON/OFF. Here, the <value> of supply ON is [0x11], while the <value> of supply OFF is [0x12]. Other <value>s are defined according to the USB protocol. The <value>s [0x00~0x0c] as shown in FIGS. 3 and 4 are already defined as [standard request] under the USB protocol.

The USB protocol is useful for understanding the meaning of the technical terms in FIGS. 2, 3 and 4 and their explanation which are not explained in this specification.

Although the present invention has been shown and described with respect to the best mode embodiment thereof, it should be understood by those skilled in the art that the foregoing and various other changes, omissions, and additions in the form and detail thereof may be made therein without departing from the spirit and scope of the present invention.

What is claimed is:

1. A method for controlling current consumed by a peripheral which is energized by a host computer, which comprises the steps of:

adding control data implemented for controlling said current into a data packet transmitted from said host computer to said peripheral;

controlling said current by said control data; and wherein said control data is transmitted through a universal serial bus (USB).

2. The method for controlling current consumed by a peripheral according to claim 1, wherein said current is increased during activating an application, while it is decreased during pausing an application.

3. The method for controlling current consumed by a peripheral according to claim 1, wherein said control data is implemented on a data packet of SET UP Transaction of a communication packet in said USB.

4. An apparatus for controlling current consumed by a peripheral, which comprises a host computer, and said peripheral which is energized by said host computer, wherein said peripheral further comprises:

data detection unit for detecting current control data among the data transmitted from said host computer; and variable supply control unit which switches on/off the current supplied for said peripheral on the basis of said current control data; and wherein said host computer is connected with said peripheral by universal serial bus (USB) interface.

5. An apparatus for controlling current consumed by a peripheral, which comprises a host computer, and said peripheral which is energized by said host computer, wherein said peripheral further comprises:

communication buffer for communicating with the host computer;

communication control unit for controlling buffer;

data detection unit for detecting current control data among the received;

supply control unit for generating supply control signal for switching on/off the current on the basis of the output from data detection unit;

variable supply control unit for switching on/off the current supplied for peripheral on the basis of said supply control signal; and wherein said host computer is connected with said peripheral by universal serial bus (USB) interface.

* * * * *